US008768533B2

(12) United States Patent
Ichikawa

(10) Patent No.: US 8,768,533 B2
(45) Date of Patent: *Jul. 1, 2014

(54) VEHICLE, COMMUNICATION SYSTEM, AND COMMUNICATION DEVICE

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/141,043

(22) PCT Filed: Apr. 9, 2010

(86) PCT No.: PCT/JP2010/056416
§ 371 (c)(1),
(2), (4) Date: Jun. 20, 2011

(87) PCT Pub. No.: WO2011/125214
PCT Pub. Date: Oct. 13, 2011

(65) Prior Publication Data
US 2013/0124005 A1 May 16, 2013

(51) Int. Cl.
H02J 7/00 (2006.01)
H02J 9/00 (2006.01)
H02M 7/00 (2006.01)
B60K 26/04 (2006.01)

(52) U.S. Cl.
USPC ............ 701/1; 320/128; 320/109; 320/111; 320/104; 320/107; 363/17; 363/132; 180/65.29

(58) Field of Classification Search
USPC ......... 180/65.1–65.31, 65.27, 65.29; 307/9.1, 307/10.4, 10.7, 10.1, 72–75, 80–87, 18, 25, 307/29; 320/104–112; 361/139; 439/34, 439/128, 503; 701/22, 36, 63, 76; 903/903, 903/907

See application file for complete search history.

(56) References Cited

U.S. PATENT DOCUMENTS 4,074,145 A * 2/1978 Laffoon et al. ............... 307/10.1
4,853,557 A * 8/1989 Meier et al. .................. 307/10.1

(Continued)

FOREIGN PATENT DOCUMENTS

JP A-55-163934 12/1980
JP A-07-264250 10/1995

(Continued)

OTHER PUBLICATIONS

Apr. 2, 2013 Japanese Office Action issued in Japanese Application No. 2011-524528.

(Continued)

Primary Examiner — Fadey Jabr
Assistant Examiner — Allen E Quillen
(74) Attorney, Agent, or Firm — Oliff, PLC

(57) ABSTRACT

A communication device includes a first resistance circuit (RB) connected between an output of a signal generating unit (602) and a first terminal (TS1) and having a resistance value corresponding to a requested operation mode requested to a vehicle. The vehicle (10) includes: a second resistance circuit (RA) connected between a ground node (512) fed with a reference potential and a second terminal (TS2); and a vehicle control unit (508) for setting an operation mode of the vehicle. The vehicle control unit (508) detects a signal potential of a signal (CPLT) via a first signal extraction node (N1) provided on a path connecting the second terminal (TS2) and a second resistance circuit (RA) to each other, and sets the operation mode of the vehicle (10) at the requested operation mode corresponding to the resistance value of the first resistance circuit (RB).

15 Claims, 8 Drawing Sheets

(56) References Cited

U.S. PATENT DOCUMENTS

| | | | |
|---|---|---|---|
| 5,600,634 A | 2/1997 | Satoh et al. | |
| 5,635,771 A | 6/1997 | Mertl et al. | |
| 5,635,804 A * | 6/1997 | Tanaka et al. | 318/139 |
| 6,433,519 B2 * | 8/2002 | Taniguchi et al. | 322/28 |
| 6,724,100 B1 * | 4/2004 | Gabriel | 307/9.1 |
| 6,795,756 B1 * | 9/2004 | Zhang et al. | 701/22 |
| 6,812,735 B1 * | 11/2004 | Pham | 326/30 |
| 6,914,418 B2 * | 7/2005 | Sung | 320/140 |
| 7,253,584 B2 * | 8/2007 | Souther et al. | 320/104 |
| 7,408,326 B2 * | 8/2008 | Formenti et al. | 320/163 |
| 7,567,061 B2 * | 7/2009 | Grand et al. | 320/132 |
| 7,664,168 B2 * | 2/2010 | Yamazaki | 375/220 |
| 7,734,940 B2 * | 6/2010 | Yamazaki | 713/322 |
| 7,891,451 B2 * | 2/2011 | Oyobe et al. | 180/65.275 |
| 7,907,062 B2 * | 3/2011 | Feliss et al. | 340/693.6 |
| 7,932,633 B2 * | 4/2011 | King et al. | 307/45 |
| 7,948,207 B2 * | 5/2011 | Scheucher | 320/104 |
| 7,949,435 B2 * | 5/2011 | Pollack et al. | 700/291 |
| 8,047,316 B2 * | 11/2011 | Takami et al. | 180/65.29 |
| 8,049,367 B2 * | 11/2011 | Izumi et al. | 307/66 |
| 8,085,098 B2 * | 12/2011 | Yamazaki | 331/10 |
| 8,143,856 B2 * | 3/2012 | Andrea et al. | 320/109 |
| 8,244,422 B2 * | 8/2012 | Fujitake | 701/22 |
| 8,299,754 B2 * | 10/2012 | Hayashigawa et al. | 320/109 |
| 8,324,859 B2 * | 12/2012 | Rossi | 320/109 |
| 8,350,527 B2 * | 1/2013 | Ichikawa | 320/109 |
| 8,368,350 B2 * | 2/2013 | Iwanaga et al. | 320/109 |
| 8,368,352 B2 * | 2/2013 | Ichikawa et al. | 320/109 |
| 8,378,628 B2 * | 2/2013 | Ichikawa et al. | 320/109 |
| 8,427,010 B2 * | 4/2013 | Bose et al. | 307/82 |
| 2003/0039313 A1 | 2/2003 | Inoue et al. | |
| 2004/0062059 A1 * | 4/2004 | Cheng et al. | 363/17 |
| 2005/0236901 A1 * | 10/2005 | Killian et al. | 307/66 |
| 2006/0250902 A1 * | 11/2006 | Bender et al. | 369/1 |
| 2007/0282495 A1 * | 12/2007 | Kempton et al. | 701/22 |
| 2008/0084179 A1 * | 4/2008 | Emori et al. | 320/109 |
| 2009/0058097 A1 | 3/2009 | Oyobe et al. | |
| 2009/0103341 A1 * | 4/2009 | Lee et al. | 363/124 |
| 2009/0184681 A1 * | 7/2009 | Kuno | 320/128 |
| 2009/0206670 A1 * | 8/2009 | Whitted et al. | 307/64 |
| 2009/0315518 A1 * | 12/2009 | Soma et al. | 320/134 |
| 2010/0017045 A1 * | 1/2010 | Nesler et al. | 700/296 |
| 2010/0017249 A1 * | 1/2010 | Fincham et al. | 705/8 |
| 2010/0213896 A1 | 8/2010 | Ishii et al. | |
| 2010/0228413 A1 | 9/2010 | Fujitake | |
| 2010/0270860 A1 * | 10/2010 | Kamaga | 307/10.7 |
| 2010/0295507 A1 | 11/2010 | Ishii et al. | |
| 2010/0301668 A1 * | 12/2010 | Yakes et al. | 307/9.1 |
| 2011/0095601 A1 * | 4/2011 | Johansson | 307/9.1 |
| 2011/0109158 A1 * | 5/2011 | Olsen | 307/10.1 |
| 2011/0121779 A1 | 5/2011 | Ichikawa et al. | |
| 2011/0133655 A1 * | 6/2011 | Recker et al. | 315/159 |
| 2011/0133693 A1 * | 6/2011 | Lowenthal et al. | 320/109 |
| 2011/0169447 A1 * | 7/2011 | Brown et al. | 320/109 |
| 2011/0204720 A1 * | 8/2011 | Ruiz et al. | 307/66 |
| 2011/0245987 A1 * | 10/2011 | Pratt et al. | 700/295 |
| 2011/0258112 A1 * | 10/2011 | Eder et al. | 705/39 |
| 2011/0291612 A1 * | 12/2011 | Fujitake | 320/107 |
| 2011/0295456 A1 * | 12/2011 | Yamamoto et al. | 701/22 |
| 2012/0007553 A1 * | 1/2012 | Ichikawa et al. | 320/109 |
| 2012/0007554 A1 * | 1/2012 | Kanamori et al. | 320/109 |
| 2012/0019203 A1 * | 1/2012 | Kressner | 320/109 |
| 2012/0091954 A1 * | 4/2012 | Matsuki | 320/109 |
| 2012/0091958 A1 * | 4/2012 | Ichikawa et al. | 320/109 |
| 2012/0098490 A1 * | 4/2012 | Masuda | 320/109 |
| 2012/0161797 A1 * | 6/2012 | Hein | 324/705 |
| 2012/0181865 A1 * | 7/2012 | Muthu | 307/26 |
| 2012/0265459 A1 * | 10/2012 | Sfaelos | 702/61 |
| 2012/0290151 A1 * | 11/2012 | Bissontz | 701/2 |
| 2013/0000295 A1 * | 1/2013 | Bissontz | 60/409 |
| 2013/0069425 A1 * | 3/2013 | Kanazawa | 307/9.1 |

FOREIGN PATENT DOCUMENTS

| | | | | |
|---|---|---|---|---|
| JP | A-09-270782 | | 10/1997 | |
| JP | A-2001-008380 | | 1/2001 | |
| JP | A-2003-069653 | | 3/2003 | |
| JP | A-2004-120310 | | 4/2004 | |
| JP | 2006246569 A | * | 9/2006 | |
| JP | A-2006-345621 | | 12/2006 | |
| JP | 2007312597 A | * | 11/2007 | |
| JP | A-2009-077535 | | 4/2009 | |
| JP | 2009248644 A | * | 10/2009 | |
| JP | 2010241427 A | * | 10/2010 | |
| JP | 2012201267 A | * | 10/2012 | |
| WO | WO 2004009397 A1 | * | 1/2004 | B60L 11/18 |
| WO | WO 2009/035069 A1 | | 3/2009 | |
| WO | WO 2009/090810 A1 | | 7/2009 | |

OTHER PUBLICATIONS

International Search Report issued in International Application No. PCT/JP2010/056416 dated Jul. 13, 2010.

Mar. 18, 2014 Office Action issued in U.S Appl. No. 13/582,278.

\* cited by examiner

VEHICLE, COMMUNICATION SYSTEM, AND COMMUNICATION DEVICE

TECHNICAL FIELD

The present invention relates to a vehicle, a communication system, and a communication device, in particular, a vehicle communicating with a communication device, a communication system including the vehicle and the communication device, and the communication device communicating with the vehicle.

BACKGROUND ART

In recent years, environmental friendly vehicles such as electric vehicles and hybrid vehicles have been drawing attention. As with electric vehicles, a hybrid vehicle is provided with a motor and a high-voltage battery for driving the motor.

Japanese Patent Laying-Open No. 2009-77535 (Patent Document 1) is known as a prior art document disclosing that a battery mounted on a vehicle is electrically charged from an external power source.

PRIOR ART DOCUMENTS

Patent Documents

Patent Document 1: Japanese Patent Laying-Open No. 2009-77535
Patent Document 2: Japanese Patent Laying-Open No. 2006-345621

SUMMARY OF THE INVENTION

Problems to be Solved by the Invention

Japanese Patent Laying-Open No. 2009-77535 describes that upon charging the vehicle, information about the charging is transmitted using a control pilot signal output from an oscillator built in a CCID (Charging Circuit Interrupt Device) provided in a charging cable. Thus, it has been considered and studied to make communication between the vehicle and the external device when charging the vehicle in this manner.

Meanwhile, it also has been considered to utilize a battery of a vehicle as one type of device for storing power therein in order to use a power generating device (such as a solar cell or a wind power generator) which is less likely to provide a stable output in power generation using natural energy. In such a case, it is also considered to obtain power for consumption at each home from the battery of the vehicle electrically charged in advance, as required.

However, communication in discharging from the battery of the vehicle to an electrical load or a power system in each home has not been considered much yet. In consideration of such a purpose of use, communication needs to be allowed when discharging power from the vehicle, in addition to the case of charging the vehicle.

An object of the present invention is to provide a vehicle, a communication system, and a communication device, each of which allows for communications not only when providing an operation (of electrically charging, for example) from an external facility to a vehicle, but also when providing an operation (of electrically discharging power from the vehicle, for example) from the vehicle to the external facility.

Means for Solving the Problems

In summary, the present invention provides a vehicle communicating with a communication device. The communication device includes: a signal generating unit for generating a signal including a signal potential that is based on a reference potential, a first terminal for communicating with the vehicle; and a first resistance circuit connected between an output of the signal generating unit and the first terminal and having a resistance value corresponding to a requested operation mode requested to the vehicle. The vehicle includes: a second terminal connected to the first terminal; a second resistance circuit connected between a node fed with the reference potential and the second terminal; and a vehicle control unit for setting an operation mode of the vehicle. The vehicle control unit detects the signal potential of the signal via a first signal extraction node provided on a path connecting the second terminal and the second resistance circuit to each other, so as to set the operation mode of the vehicle at the requested operation mode corresponding to the resistance value of the first resistance circuit.

Preferably, the second resistance circuit is configured to have a resistance value variable according to a control signal provided from the vehicle control unit. After completing setting the operation mode of the vehicle at the requested operation mode, the vehicle control unit changes the resistance value of the second resistance circuit from a first value to a second value different from the first value.

Preferably, as the operation mode, the vehicle has a first mode for receiving power from outside, and a second mode for supplying power to outside.

More preferably, the second resistance circuit is configured to have a resistance value variable according to a control signal provided from the vehicle control unit. After completing setting the operation mode of the vehicle at one of the first and second modes, the vehicle control unit changes the resistance value of the second resistance circuit from a first value to a second value different from the first value.

More preferably, positive amplitude and negative amplitude of the signal output by the signal generating unit are divided by the first resistance circuit and the second resistance circuit. After designating one of the first and second modes with a voltage division value for the positive amplitude, the vehicle control unit performs control regarding the first mode with the positive amplitude or performs control regarding the second mode with the negative amplitude.

Further preferably, the vehicle further includes a rectifying circuit for differentiating the voltage division value for the positive amplitude and the voltage division value for the negative amplitude from each other by changing the resistance value of the first resistance circuit for the positive side and the negative side relative to the reference potential.

More preferably, the communication device is included in a facility including a system interconnection relay allowing for connection and disconnection to and from a commercial power grid. As the second mode, the vehicle has a system interconnection power generation mode for generating power with interconnection with the commercial power grid, and an independent power generation mode for generating power with the facility being disconnected from the commercial power grid.

According to another aspect, the present invention provides a communication system including: a vehicle; and a communication device communicating with the vehicle. The communication device includes: a signal generating unit for generating a signal including a signal potential that is based on a reference potential; a first terminal for communicating with the vehicle; and a first resistance circuit connected between an output of the signal generating unit and the first terminal and having a resistance value corresponding to a requested operation mode requested to the vehicle. The vehicle includes: a second terminal connected to the first terminal; a second resistance circuit connected between a node fed with the reference potential and the second terminal; and a vehicle control unit for setting an operation mode of the vehicle. The vehicle control unit detects the signal potential of the signal via a first signal extraction node provided on a path connecting the second terminal and the second resistance circuit to each other, so as to set the operation mode of the vehicle at the requested operation mode corresponding to the resistance value of the first resistance circuit.

Preferably, the second resistance circuit is configured to have a resistance value variable according to a control signal provided from the vehicle control unit. After completing setting the operation mode of the vehicle at the requested operation mode, the vehicle control unit changes the resistance value of the second resistance circuit from a first value to a second value different from the first value.

Preferably, as the operation mode, the vehicle has a power receiving mode for receiving power from outside, and a power supply mode for supplying power to outside.

More preferably, the second resistance circuit is configured to have a resistance value variable according to a control signal provided from the vehicle control unit. After completing setting the operation mode of the vehicle at one of the power receiving mode and the power supply mode, the vehicle control unit changes the resistance value of the second resistance circuit from a first value to a second value different from the first value.

More preferably, positive amplitude and negative amplitude of the signal output by the signal generating unit are divided by the first resistance circuit and the second resistance circuit. After designating one of the power receiving mode and the power supply mode with a voltage division value for the positive amplitude, the vehicle control unit performs control regarding the power receiving mode with the positive amplitude or performs control regarding the power supply mode with the negative amplitude.

More preferably, the communication device is included in a facility including a system interconnection relay allowing for connection and disconnection to and from a commercial power grid. As the power supply mode, the vehicle has a system interconnection power generation mode for generating power with interconnection with the commercial power grid, and an independent power generation mode for generating power with the facility being disconnected from the commercial power grid.

Further preferably, the communication device further includes a control unit for switching the resistance value of the first resistance circuit to a value corresponding to the operation mode requested to the vehicle, depending on whether the operation mode requested to the vehicle is the power receiving mode, the system interconnection power generation mode, or the independent power generation mode.

According to still another aspect, the present invention provides a communication device for communicating with a vehicle. The communication device includes: a signal generating unit for generating a signal including a signal potential that is based on a reference potential; a first terminal for communicating with the vehicle; a first resistance circuit connected between an output of the signal generating unit and the first terminal and having a resistance value varying according to a first input signal; and a control unit for providing the first input signal to the first resistance circuit. The vehicle includes: a second terminal connected to the first terminal; a second resistance circuit connected between a node fed with the reference potential and the second terminal; and a vehicle control unit for setting an operation mode of the vehicle. The vehicle control unit detects the signal potential of the signal via a first signal extraction node provided on a path connecting the second terminal and the second resistance circuit to each other so as to set the operation mode of the vehicle at the requested operation mode corresponding to the resistance value of the first resistance circuit, and then changes the resistance value of the second resistance circuit. The control unit detects that the resistance value of the second resistance circuit has been changed and starts an operation corresponding to the operation mode requested.

Effects of the Invention

According to the present invention, communication between a communication device and a vehicle can be implemented not only when performing an operation (of electrically charging or the like) from an external facility to the vehicle but also when performing an operation (of discharging electric power or the like) from the vehicle to the external facility.

MODES FOR CARRYING OUT THE INVENTION

Figure 1:
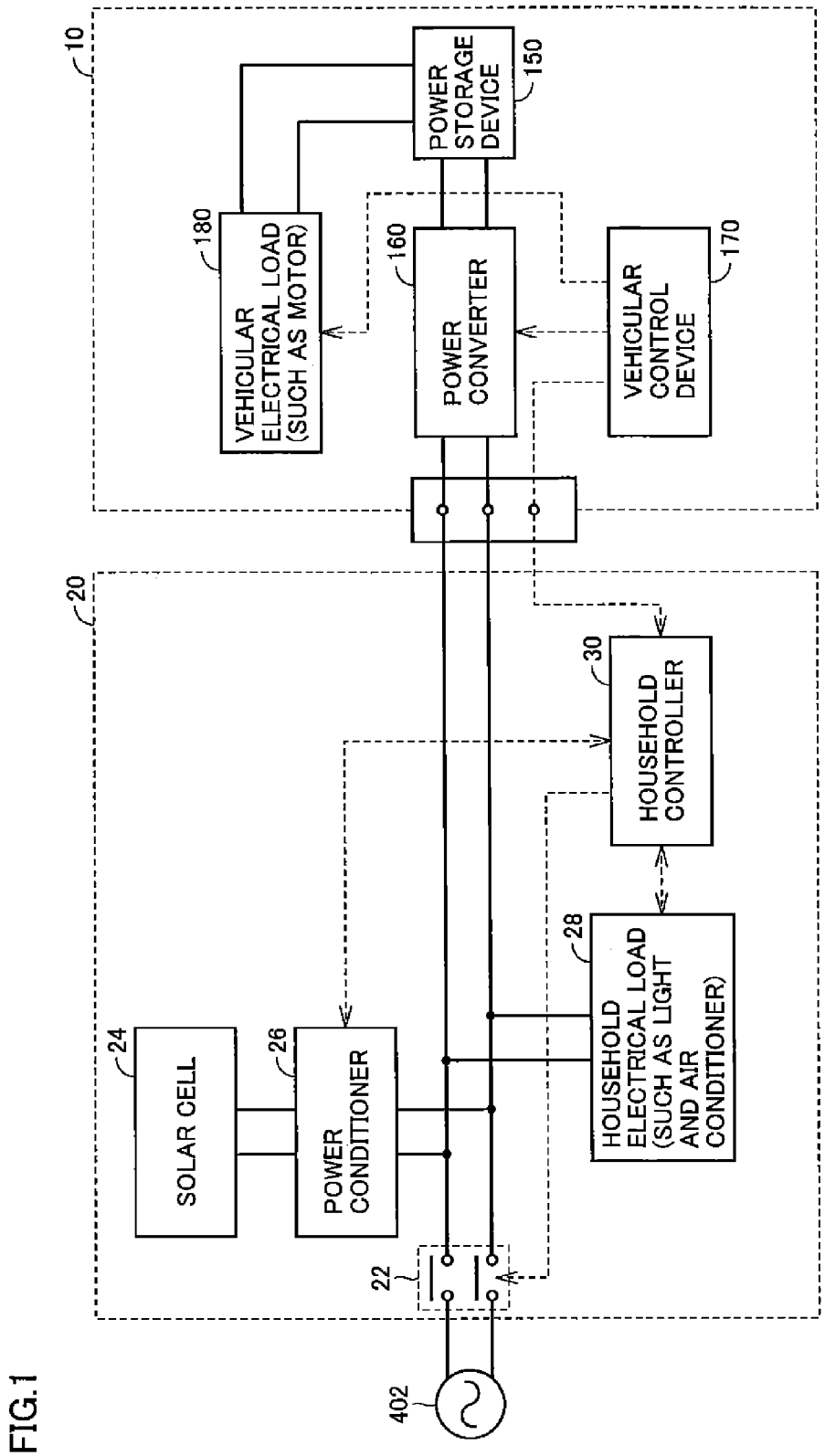
FIG. 1 illustrates an entire configuration of a communication system of the present embodiment.

The following describes an embodiment of the present invention in detail with reference to figures. It should be noted that the same or corresponding portions in the figures are given the same reference characters and are not described repeatedly.

FIG. 1 illustrates the entire configuration of a communication system of the present embodiment.

Referring to FIG. 1, the communication system includes a vehicle 10 and a connection target facility 20. Vehicle 10 is, for example, a vehicle employing electric power for traveling, such as a hybrid vehicle, an electric vehicle, or a fuel cell vehicle. Vehicle 10 is configured to be capable of receiving power from external connection target facility 20 when being electrically charged, and of discharging or generating power to provide connection target facility 20 with the power.

Connection target facility 20 includes: a solar cell 24; a power conditioner 26 for controlling solar cell 24; household electrical loads (lights, air conditioners, devices connected to electric receptacles, and the like) 28; a system interconnection relay 22 for achieving connection to an external power source 402 (commercial power system); and a household controller 30. Household controller 30 controls system interconnection relay 22, power conditioner 26, and household electrical loads 28. Further, household controller 30 also serves as a communication device for making communication with vehicle 10.

It should be noted that connection target facility 20 illustrated herein is a general house, but may be a power charging station, a parking lot, or the like.

Vehicle 10 includes: a vehicular electrical load 180 such as a motor; a power storage device 150 for supplying power to vehicular electrical load 180; a power converter 160 for electrically charging power storage device 150 with power from external power source 402 (commercial power system) or solar cell 24; and a vehicular control device 170. Power converter 160 is also used to discharge, to the power system, electric power energy stored in power storage device 150. Vehicular control device 170 controls not only vehicular electrical load 180 but also power converter 160. Control device 170 is capable of bidirectionally communicating with household controller 30.

If vehicle 10 is a hybrid vehicle, vehicle 10 further includes an engine and a power generator. If vehicle 10 is a fuel cell vehicle, vehicle 10 further includes a fuel cell. These vehicles, which have a power generation function, can continuously supply power to outside for a long time as far as they are supplied with fuel continuously.

If such vehicles capable of supplying power to outside are increased in number, the vehicles may begin to be used as an auxiliary power plant. Vehicles, in particular, those for commuting, are parked in a parking lot or in front of houses for most of the time. By connecting these parked vehicles to a power system and providing a permitted amount of power from the vehicles in the parked places, a significant effect for the power system can be expected. Providing power from the vehicle to the power grid in this way is called "V2G (Vehicle To Grid)". Plug-in hybrid vehicles and electric vehicles have a function of electrically charging their power storage devices from a power system. Hence, V2G can be implemented by providing the vehicles with a function of performing control and discharging utilizing two-way communication so as to allow the vehicles to provide power to the power system.

Figure 2:
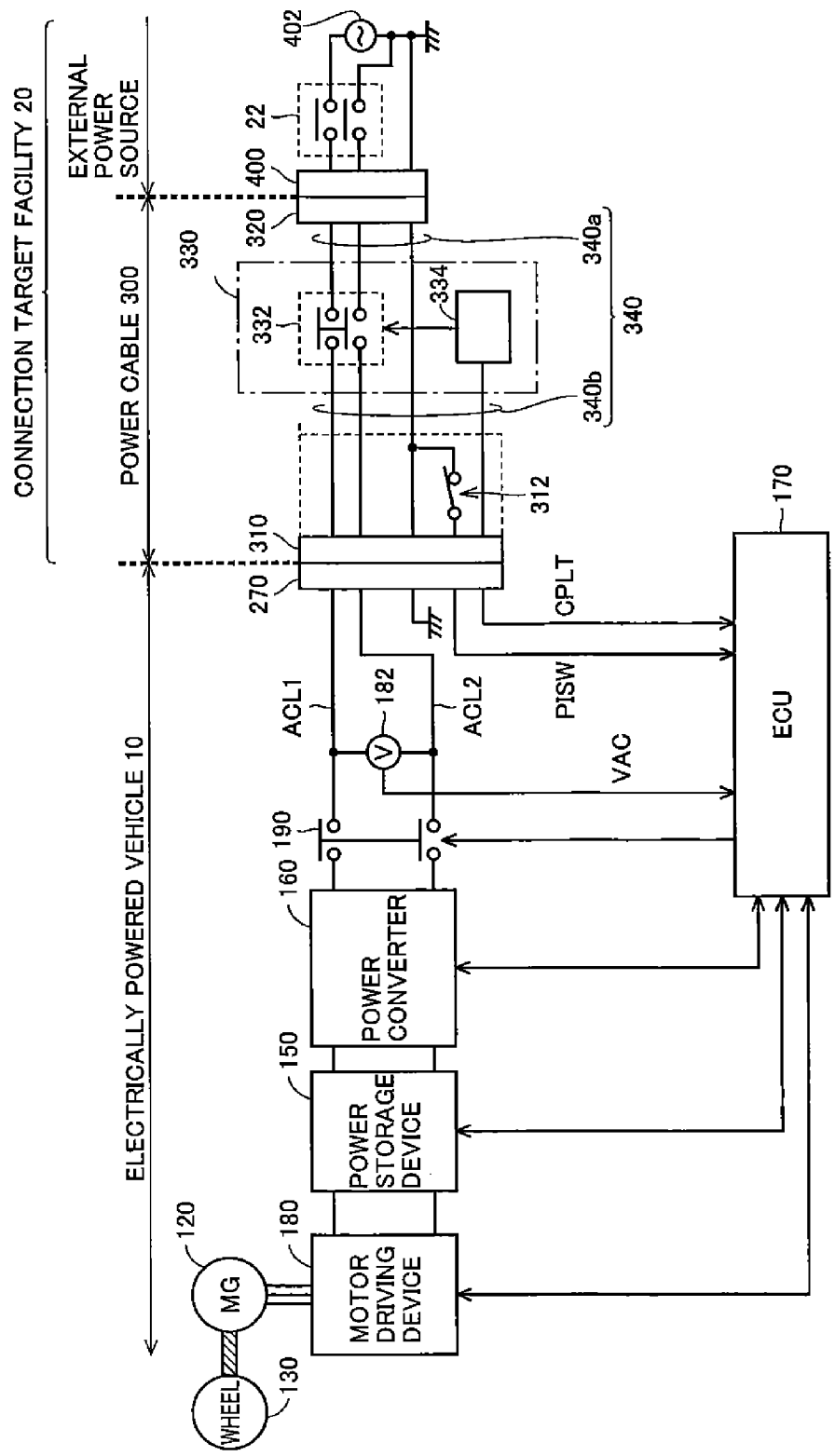
FIG. 2 is a schematic diagram of a more specific example of a vehicle 10 constituting the communication system in the present embodiment.

FIG. 2 is a schematic diagram of a more specific example of vehicle 10 constituting the communication system in the present embodiment.

Referring to FIG. 2, vehicle 10 includes: power storage device 150 for storing electric power therein to drive the vehicle; a motor generator (hereinafter, also referred to as "MG") 120 for generating driving power; a motor driving device (vehicular electrical load 180) for controlling driving of motor generator 120 using the electric power stored in the power storage device; wheels 130 to which the driving power generated by motor generator 120 is transmitted; and a control device (hereinafter, also referred to as "ECU (Electronic Control Unit)") 170 for controlling entire operations of vehicle 10.

Further, vehicle 10 includes: a vehicular inlet 270 provided at the body of vehicle 10 for charging from an external power source; a relay 190; and power converter 160 for electrically charging power storage device 150 with the external power source or supplying power from power storage device 150 to outside. Power converter 160 is connected to vehicular inlet 270 via relay 190 by power lines ACL1, ACL2. Power converter 160 is also connected to power storage device 150. A voltage sensor 182 is provided between power lines ACL1 and ACL2. Voltage sensor 182 sends a result of detection of voltage (voltage from the external power source) to ECU 170. Further, ECU 170 receives, via vehicular inlet 270, a cable connection signal PISW and a pilot signal CPLT each output from the charging cable 300 side.

Power storage device 150 is a power storage element configured to be chargeable/dischargeable. Power storage device 150 includes, for example, a secondary battery such as a lithium ion battery or a nickel-hydrogen battery, or a storage element such as an electric double layer capacitor. Further, power storage device 150 further includes: a voltage sensor (not shown) for detecting a voltage between the power lines connected to power storage device 150; and a current sensor (not shown) for detecting a current flowing in a power line of anode side or cathode side. The voltage and current signals detected by the sensors are sent to ECU 170.

Power converter 160, which is used for charging, is controlled by ECU 170. Power converter 160 receives alternating-current power transmitted from external power source 402 via charging cable 300, vehicular inlet 270, power lines ACL1, ACL2, and relay 190, and converts the alternating-current power to direct-current power in order to electrically charge power storage device 150. It can be configured to directly charge power storage device 150 with the power supplied from external power source 402. In this case, power converter 160 is not provided.

The motor driving device (vehicular electrical load 180) is controlled by ECU 170. The motor driving device (vehicular electrical load 180) converts the power stored in power storage device 150, into power used to control driving of motor generator 120. Representatively, motor generator 120 is constituted by a three-phase synchronous motor of permanent-magnet type, and the motor driving device (vehicular electrical load 180) is constituted by a three-phase inverter. Output torque from motor generator 120 is transmitted to wheels 130 via a motive power split device, a speed reducer, and the like each not shown in the figures, whereby vehicle 10 travels.

Motor generator 120 is capable of generating electric power using rotational force from wheels 130 when vehicle 10 operates for regenerative braking. Then, the power thus generated can be used to charge power storage device 150 using the motor driving device (vehicular electrical load 180).

Further, in the case of hybrid vehicles each provided with an engine (not shown) apart from motor generator 120, required vehicle driving power is generated by cooperatively operating the engine and motor generator 120. On this occasion, power storage device 150 can be charged using the power generated by rotation of the engine.

Charging cable 300 includes: a charging connector 310 for the vehicle side; a plug 320 for the external power source side; a charging circuit interrupt device (hereinafter, also referred to as "CCID") 330; and electric wire portions 340 for connecting devices to each other for input/output of power and control signals. Electric wire portions 340 includes: an electric wire portion 340a for connecting plug 320 and CCID 330 to each other; and an electric wire portion 340b for connecting charging connector 310 and CCID 330 to each other.

Charging cable 300 is connected to power receptacle 400 of external power source 402 (for example, system power grid) by plug 320 located at the external power source side in charging cable 300. Further, vehicular inlet 270 provided in the body of vehicle 10 and charging connector 310 of charging cable 300 for the vehicle side are connected to each other, thereby electrically charging vehicle 10 from external power source 402.

Between external power source 402 and power receptacle 400 for the vehicle, system interconnection relay 22 may be provided.

In charging connector 310, a limit switch 312 is provided to detect connection of charging connector 310. Limit switch 312 is closed when vehicular inlet 270 and charging connector 310 are connected to each other. Limit switch 312 has one side connected to a control line in charging cable 300 grounded at the vehicle side and the external power source side, and has the other side connected to ECU 170 of the vehicle via charging connector 310. When limit switch 312 is closed, cable connection signal PISW is provided to ECU 170.

CCID 330 includes a CCID relay 332, and a control pilot circuit 334. CCID relay 332 is provided for a pair of power lines in the charging cable. CCID relay 332 is controlled to be on/off by control pilot circuit 334. When CCID relay 332 is turned off, the electric path is interrupted in the charging cable. On the other hand, when CCID relay 332 is turned on, power can be supplied from external power source 402 to vehicle 10.

Control pilot circuit 334 sends pilot signal CPLT to ECU 170 of the vehicle via charging connector 310 and vehicular inlet 270. This pilot signal CPLT is a signal for providing notification of the rated current of the charging cable from control pilot circuit 334 to ECU 170 of the vehicle. Further, pilot signal CPLT is also used as a signal for remotely controlling CCID relay 332 from ECU 170 based on the potential of pilot signal CPLT controlled by ECU 170. Further, control pilot circuit 334 controls CCID relay 332 to be on/off based on change in the potential of pilot signal CPLT. Namely, pilot signal CPLT is exchanged between ECU 170 and CCID 330.

Further, in the present embodiment, pilot signal CPLT is also used for communication upon supplying power from the vehicle to the connection target facility as described below in detail with reference to FIG. 5.

Figure 3:
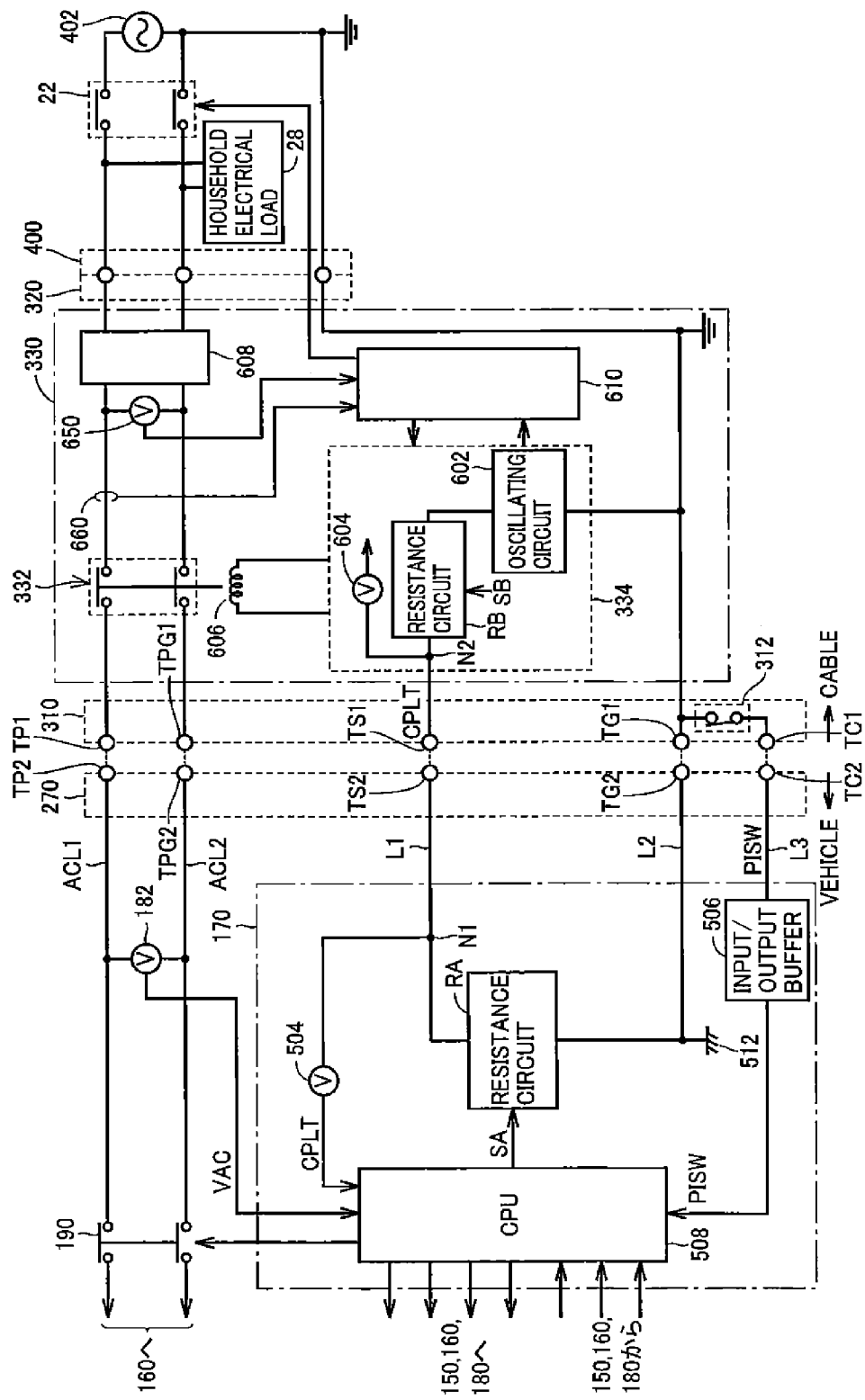
FIG. 3 illustrates hardware for communication between the vehicle and a COD shown in FIG. 2 more in detail.

FIG. 3 illustrates hardware for the communication between the vehicle and the CCID shown in FIG. 2 more in detail.

Referring to FIG. 3, vehicular inlet 270 includes: terminals TP2, TPG2 respectively connected to power lines ACL1, ACL2; a terminal TS2 connected to control pilot signal line L1; and a terminal TG2 connected to a ground line L2; and a terminal TC2 connected to a signal line L3.

Charging connector 310 of the charging cable includes terminals TP1, TPG1, TS1, TG1, TC1 respectively connected to terminals TP2, TPG2, TS2, TG2, TC2.

In addition to CCID relay 332 and control pilot circuit 334, CCID 330 includes an electro-magnetic coil 606, an electrical leakage detector 608, a CCID control unit 610, a voltage sensor 650, and a current sensor 660. Further, control pilot circuit 334 includes an oscillating circuit 602, a resistance circuit RB, and a voltage sensor 604.

Terminal TS2 is connected to a node N2 of CCID 330. Voltage sensor 604 detects a voltage at node N2. Resistance circuit RB is configured to have a resistance value variable according to signal SB. Resistance circuit RB is provided between oscillating circuit 602 and node N2.

Although not shown in the figure, CCID control unit 610 includes a CPU (Central Processing Unit), a memory device, an input/output buffer, and an indicator. CCID control unit 610 sends/receives signals to/from each sensor and control pilot circuit 334, and controls and manages the charging operation of charging cable 300.

Further, CCID control unit 610 also functions as a communication device for communication with vehicular control device 170 of the vehicle.

Oscillating circuit 602 outputs a non-oscillation signal when the potential of pilot signal CPLT detected by voltage sensor 604 is around a defined potential V1 (for example, 12V). When the potential of pilot signal CPLT is decreased from V1, oscillating circuit 602 outputs a signal oscillating at defined frequency (for example, 1 kHz) and duty cycle.

It should be noted that the potential of pilot signal CPLT can be controlled from ECU 170 of the vehicle. Further, the duty cycle is set based on a rated current that can be supplied from external power source 402 to the vehicle via the charging cable.

Meanwhile, in the vehicle, ECU 170 includes a resistance circuit RA, a voltage sensor 504, an input buffer 506, and a CPU 508. Resistance circuit RA is connected between control pilot signal line L1 and ground line L2. Resistance circuit 502 is configured to have a resistance value variable according to a control signal SA supplied from CPU 508. Resistance circuit RA is a circuit for controlling the voltage level of pilot signal CPLT from the vehicle side. Voltage sensor 504 detects a voltage at a node N1 on control pilot signal line L1, and sends a result of detection to CPU 508. Instead of voltage sensor 504, an A/D converter provided in the CPU may be used. Ground line L2 is connected to a ground node 512 of ECU 170.

Electrical leakage detector 608 is provided for the pair of power lines of the charging cable in CCID 330 so as to detect whether or not electrical leakage takes place. Specifically, electrical leakage detector 608 detects a balance state of currents flowing in the pair of power lines in opposite directions. When the balance state is lost, electrical leakage detector 608 detects occurrence of electrical leakage. Although not shown in the figure particularly, when electrical leakage detector 608 detects the electrical leakage, power supply to electromagnetic coil 606 is interrupted and CCID relay 332 is turned off.

Voltage sensor 650 detects insertion of plug 320 of charging cable 300 to power receptacle 400 of the external power source, i.e., connection thereof to external power source 402, and notify CCID control unit 610 of this. Further, current sensor 660 detects a charging current flowing in the power line, thereby detecting that vehicle 10 has started to be charged actually from external power source 402, and notifies CCID control unit 610 of this.

Voltage sensor 504 receives pilot signal CPLT of control pilot signal line L1, detects the voltage of pilot signal CPLT thus received, and outputs it to CPU 508. Input buffer 506 receives cable connection signal PISW from signal line L3 connected to limit switch 312 of charging connector 310, and sends cable connection signal PISW to CPU 508. It should be noted that signal line L3 is fed with a voltage from ECU 170. When charging connector 310 is connected to vehicular inlet 270, limit switch 312 is turned on, thereby bringing the potential of signal line L3 to the ground level. In other words, cable connection signal PISW is a signal which becomes an L (logic low) level when charging connector 310 is connected to vehicular inlet 270, and becomes an H (logic high) level when charging connector 310 is not connected thereto.

Based on cable connection signal PISW and pilot signal CPLT, CPU 508 determines whether or not external power source 402 and vehicle 10 are connected to each other. Specifically, CPU 508 detects whether or not vehicular inlet 270 and charging connector 310 are connected to each other, based on cable connection signal PISW received from input buffer 506, and detects whether or not plug 320 and power receptacle 400 are connected to each other, based on whether or not the voltage of pilot signal CPLT received from voltage sensor 504 has been detected.

When it is detected based on cable connection signal PISW that vehicular inlet 270 and charging connector 310 are connected to each other, CPU 508 changes control signal SA. Accordingly, the potential of pilot signal CPLT is decreased from V1, whereby pilot signal CPLT oscillates. Further, based on the duty cycle of pilot signal CPLT, CPU 508 detects the rated current that can be supplied from external power source 402 to vehicle 10.

Figure 4:
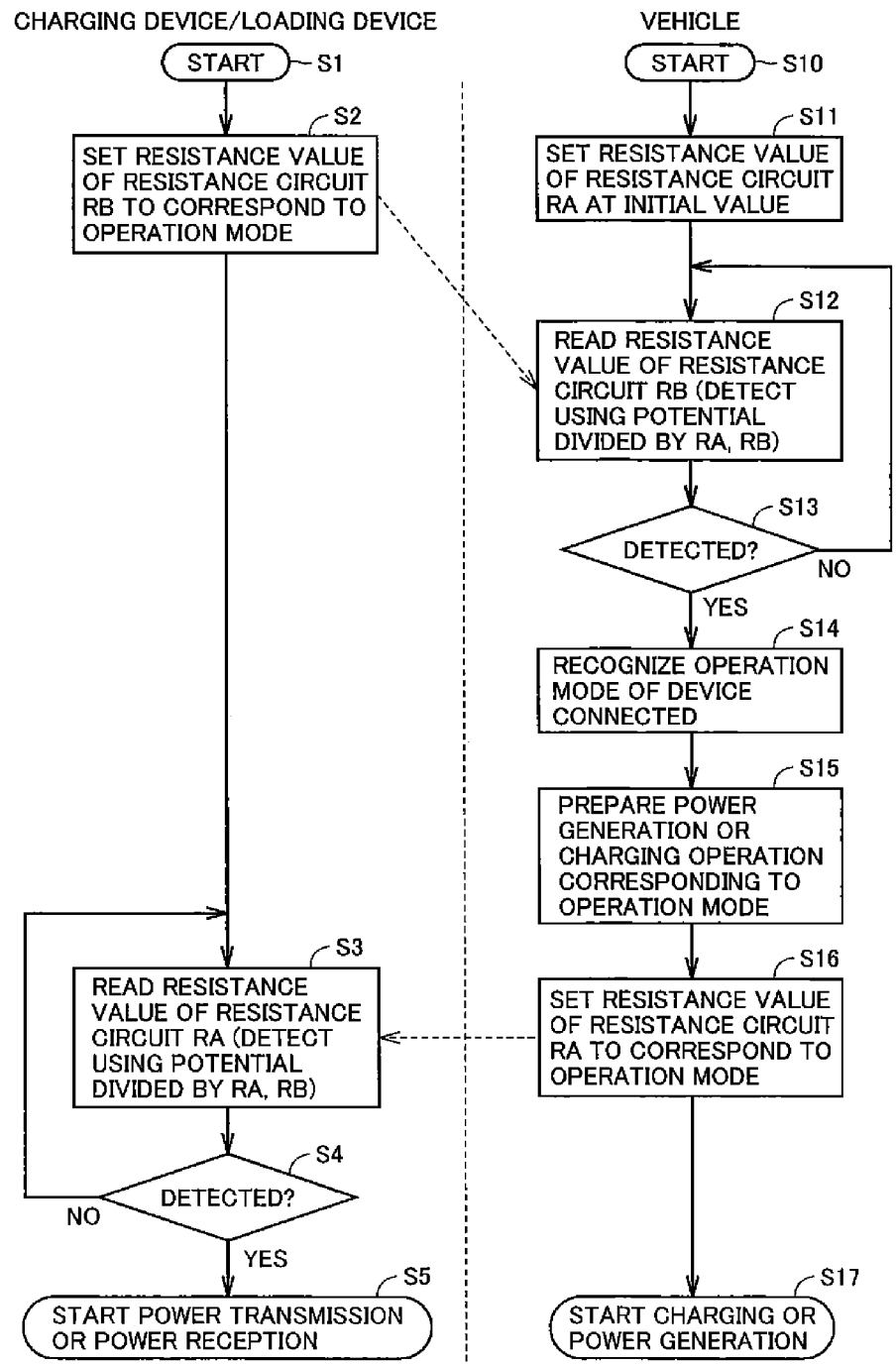
FIG. 4 is a flowchart for illustrating control for implementing the communication in the configuration of FIG. 3.

FIG. 4 is a flowchart for illustrating control for implementing communication in the configuration of FIG. 3. In FIG. 4, at the left side, a flowchart of control performed by the charging device or loading device is illustrated whereas at the right side, a flowchart of control performed by the vehicle is illustrated.

Referring to FIG. 3 and FIG. 4, first, when the vehicle is connected to the charging device or loading device by the power cable, the charging device or loading device starts to be controlled in a step S1 and the vehicle starts to be controlled in a step S10.

Then, in a step S2, the resistance value of resistance circuit RB is set by the charging device or loading device in accordance with an operation mode. For example, the operation mode is a "charging mode" when the connection target device is a power charging station or a household receptacle for charging the vehicle. On the other hand, when the connection target device is a house or a business place and is supplied with power from the vehicle, the operation mode is a "power generation mode". The power generation mode is divided into a "system interconnection power generation mode" and an "independent power generation mode" depending on whether to operate with interconnection with the power system or operate solely.

In the vehicle, in a step S11, the resistance value of resistance circuit RA is set at an initial value. Then, in a step S12, the resistance value of resistance circuit RB is read. This reading is performed as follows. That is, voltage sensor 504 reads a value obtained by resistance circuit RA and resistance circuit RB dividing the predetermined potential of the signal of oscillating circuit 602. By setting the predetermined potential of the signal of oscillating circuit 602 and the initial value of resistance circuit RA at predetermined values, CPU 508 can recognize the resistance value at which resistance circuit RB has been set.

Then, in a step S13, it is determined whether or not a detection condition for the divided potential has been satisfied. For example, the detection condition for divided potential is considered to be satisfied when a predetermined time, during which the charging device or loading device is set to complete step S2, has passed after the connection of the cable and the divided potential is detected stably.

If the detection condition is not satisfied in step S13, the process of step S12 is performed again. Further, when the detection condition is satisfied in step S13, the process goes to a step S14.

In step S14, a process is performed to recognize the operation mode of the device connected. Specifically, depending on whether the device connected is to electrically charge the vehicle or is requesting for reception of power from the vehicle, resistance circuit RB is set at a different value. To attain this, the operation mode is recognized by checking for a resistance value or a divided potential in a relational table of resistance values of resistance circuit RB (or corresponding divided potential) and the operation modes. The relational table is prepared in CPU 508.

In step S15, in the vehicle, power generation or charging operation corresponding to the operation mode is prepared. Then, in a step S16 after completion of the preparation, the resistance value of resistance circuit RA is set to correspond to the operation mode.

On the other hand, in the charging device or loading device, in a step S3, the resistance value of resistance circuit RA is read. This reading is performed as follows. That is, voltage sensor 604 reads a value obtained by resistance circuit RA and resistance circuit RB dividing the predetermined potential of the signal of oscillating circuit 602. By setting the predetermined potential of the signal of oscillating circuit 602 while the resistance value of resistance circuit RA set in step S2 is known, CPU 508 can recognize the resistance value at which resistance circuit RB has been set.

When this resistance value is changed, the charging device or loading device recognizes that the preparation corresponding to the operation mode has been completed in the vehicle.

It should be noted that the completion of the preparation may be recognized by detecting a change in the corresponding divided potential, instead of calculating the resistance value itself.

Then, in a step S4, it is determined whether or not the detection condition for the divided potential has been satisfied. For example, the detection condition for divided potential is considered to be satisfied when a predetermined time, during which the vehicle is set to complete steps S12-S16, has passed after the completion of step S2 and the divided potential is detected stably.

If the detection condition has not been satisfied in step S4, the process of step S3 is performed again. Further, in step S4, when the detection condition has been satisfied, the process goes to a step S5 to start power transmission or power reception. Further, in the vehicle, in a step S17, charging or power generation is started.

Although the power generation is illustrated in steps S15, S17, discharging is performed from the power storage device in the case where the vehicle is an electric vehicle.

Figure 5:
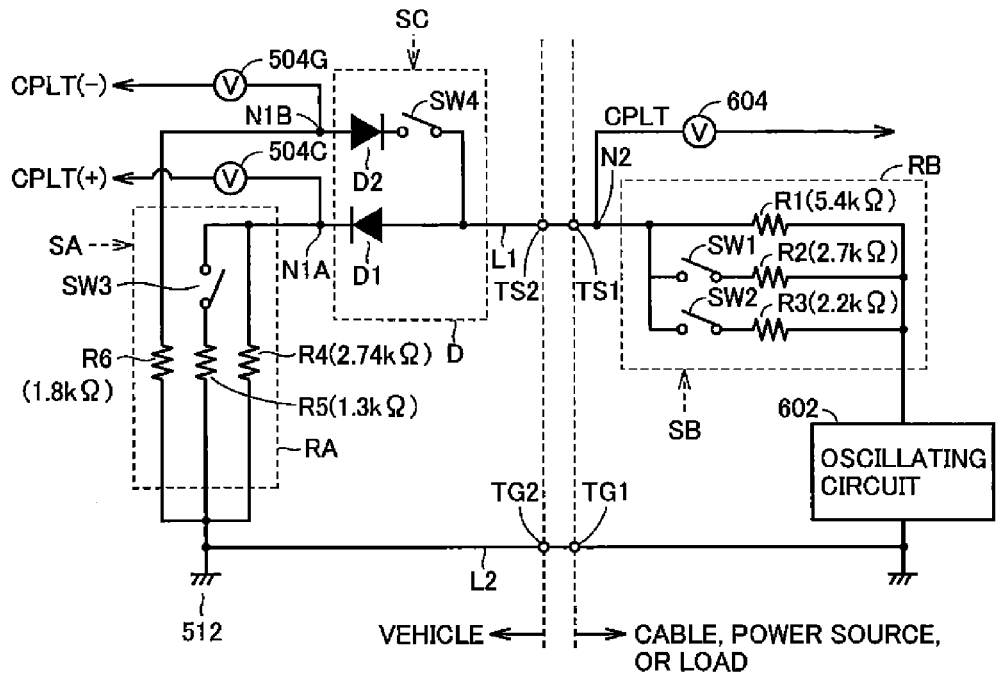
FIG. 5 shows configurations of resistance circuits more in detail.

FIG. 5 shows the configurations of the resistance circuits more in detail.

Referring to FIG. 5, resistance circuit RB includes a resistor R1 connected between the output of oscillating circuit 602 and node N2; resistors R2, R3 selectively connected between the output of oscillating circuit 602 and node N2; and switches SW1, SW2.

Switch SW1 and resistor R2 are connected in series. Switch SW1 and resistor R2 thus connected in series are connected to resistor R1 in parallel. Switch SW2 and resistor R3 are connected in series. Switch SW2 and resistor R3 thus connected in series are connected to resistor R1 in parallel. Switches SW1, SW2 are turned on/off in accordance with control signal SB.

Although FIG. 5 shows an exemplary configuration of resistance circuit RB, various other configurations can be considered for resistance circuit RB as long as resistance circuit RB has its resistance value variable according to control signal SB. For example, resistor R1 may be configured to be provided with a switch for switching the resistor completely.

Resistance circuit RA includes: a resistor R4 connected between a node N1A and ground node 512; and a switch SW3 and a resistor R5 connected in series with each other and connected to a resistor R4 in parallel. Resistance circuit RA further includes a resistor R6 connected between a node N1B and ground node 512. Switch SW3 becomes on/off according to control signal SA.

In FIG. 5, a rectifying circuit D is provided between resistance circuit RA and terminal TS2. Rectifier circuit D, connected between terminal TS2 and node N1A, includes: a diode D1 with its forward direction set at a direction from terminal TS2 toward node N1A; and a switch SW4 and a diode D2 connected in series between node N1B and terminal TS2. Diode D2 has its forward direction set at a direction from node NM toward terminal TS2. Switch SW4 opens/closes in accordance with a control signal SC. However, in the case where different voltage division ratios do not need to be set for negative and positive voltages of signal CPLT, rectifying circuit D may not be provided and node N1A and node N2 may be connected directly to each other.

Voltage sensors 504C, 504G are sensors corresponding to voltage sensor 504 of FIG. 3. Voltage sensor 504C is provided to detect the potential of node N1A. Voltage sensor 504C sends a signal CPLT (+) indicating the detected potential to CPU 508. Voltage sensor 504G is provided to detect the potential of node N1B. Voltage sensor 504G sends a signal CPLT (−) indicating the detected potential to CPU 508.

Exemplary resistance values employed are as follows: R1=5.4 kΩ, R2=2.7 kΩ, R3=2.2 kΩ, R4=2.74 kΩ, R5=1.3 kΩ, and R6=1.8 kΩ.

In this example, resistance circuit RB exhibits a resistance value of 5.4 kΩ when switches SW1, SW2 are both turned off. Resistance circuit RB exhibits a resistance value of 1.8 kΩ when switch SW1 is turned on and switch SW2 is turned off. Resistance circuit RB exhibits a resistance value of approximately 1 kΩ when switches SW1, SW2 are both turned on.

Further, when switch SW4 is closed while oscillating circuit 602 outputs a negative voltage, a current flows in resistor R6. Hence, the resistance value of resistance circuit RA is at a fixed value of 1.8 kΩ. While oscillating circuit 602 outputs a positive voltage, a current flows in resistors R4, R5. Hence, resistance circuit RA takes on a value from two resistance values, depending on a state of switch SW3. Specifically, when switch SW3 is off, the resistance value of resistance circuit RA is 2.74 kΩ, whereas when switch SW3 is on, the resistance value of resistance circuit RA is 0.88 kΩ.

In consideration of this as well as the forward voltage of diode D1 (assuming that it is 0.7 V), node N2 takes on a value of 4.5 V, 6.0 V, 7.5 V, or 9.0V by changing the resistance values of resistance circuits RA, RB, when oscillating circuit 602 has a positive voltage of 12 V.

This value includes voltages of 9.0V and 6.0V, which are required in the standards "SAE Electric Vehicle Conductive Charge Coupler" concerned with vehicular inlets and connectors in charging systems of electrically powered vehicles. Further, voltages substantially in the middle of the voltage ranges not used in the standards, i.e., voltages substantially in the middle of the voltage ranges of 7.0 V to 8.0 V and 4.0 V to 5.0 V can be output. Hence, these unused voltage ranges can be used for communication upon supplying power from the vehicle to outside. It should be noted that the resistance values of the resistance circuits may be changed to allow for outputs in other unused ranges of 0 V to 2 V and 10.0V to 11.0 V.

Figure 6:
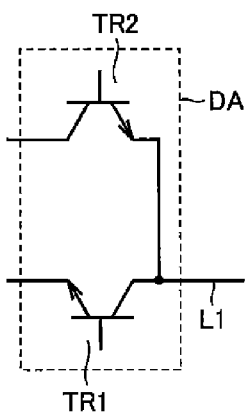
FIG. 6 illustrates a variation of a circuit in FIG. 5.

FIG. 6 illustrates a variation of the circuit in FIG. 5.

Referring to FIG. 6, in the variation, a selecting circuit DA is used instead of rectifying circuit D of FIG. 5. Selecting circuit DA includes a transistor TR1 instead of diode D1 of FIG. 5, and a transistor TR2 instead of diode D2 and switch SW4 of FIG. 5.

Selecting circuit DA may be configured to use diode D1 of FIG. 5, and use transistor TR2 instead of diode D2 and switch SW4 of FIG. 5. Further, selecting circuit DA may be configured to use diode D2 and switch SW4 of FIG. 5, and use transistor TR1 instead of diode D1 of FIG. 5.

Figure 7:
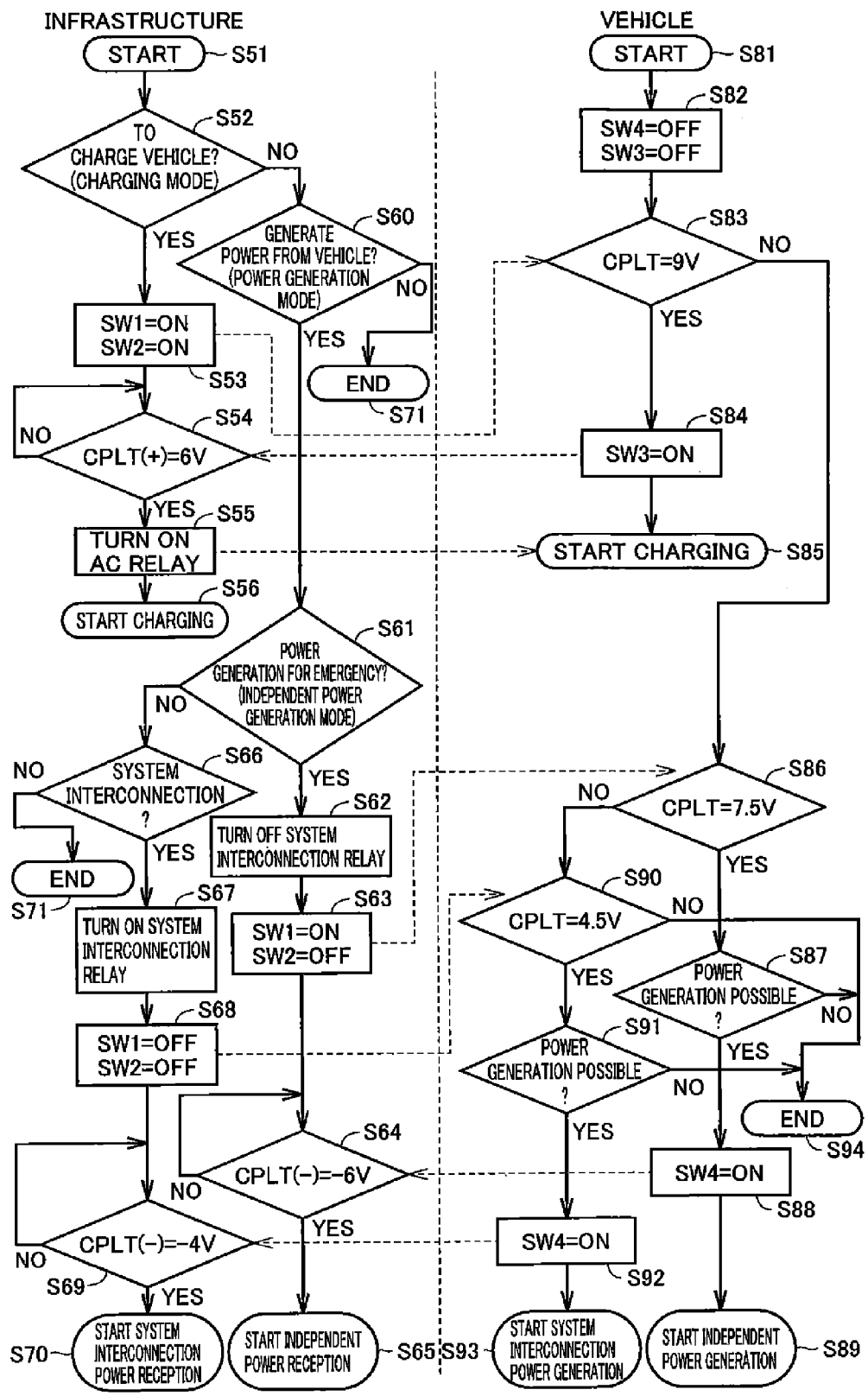
FIG. 7 is a flowchart for illustrating exemplary control using the configuration shown in FIG. 5.

FIG. 7 is a flowchart for illustrating exemplary control using the configuration shown in FIG. 5. In FIG. 7, at the left side, a flowchart of control performed in an infrastructure including the charging device or loading device, etc., is illustrated, whereas at the right side, a flowchart of control performed in the vehicle is illustrated.

Referring to FIG. 5 and FIG. 7, when the infrastructure and the vehicle are connected to each other by the cable, processes start at a step S51 and a step S81.

In step S82, in the vehicle, switches SW3, SW4 are both set to be off, thereby setting resistance circuit RA to have an initial value (for example, 2.74 kΩ). On the other hand, in the infrastructure, in step S52, it is determined whether to electrically charge the vehicle. Whether to set the operation mode at the charging mode or the power generation mode may be designated by means of an input switch used by a person who connects the power cable to the vehicle, or may be designated by means of communication from a remote location in the case of system interconnection. It should be noted that in a power charging station having no electrical load, the operation mode may be fixed to the charging mode and resistance circuit RB may have a fixed resistance value.

In step S52, when the vehicle is to be charged, i.e., when the charging mode is selected, the process goes to a step S53. In step S53, by setting both switches SW1, SW2 to be on, the resistance value of resistance circuit RB is set at a value (for example, approximately 1 kΩ) corresponding to the charging mode.

Figure 8:
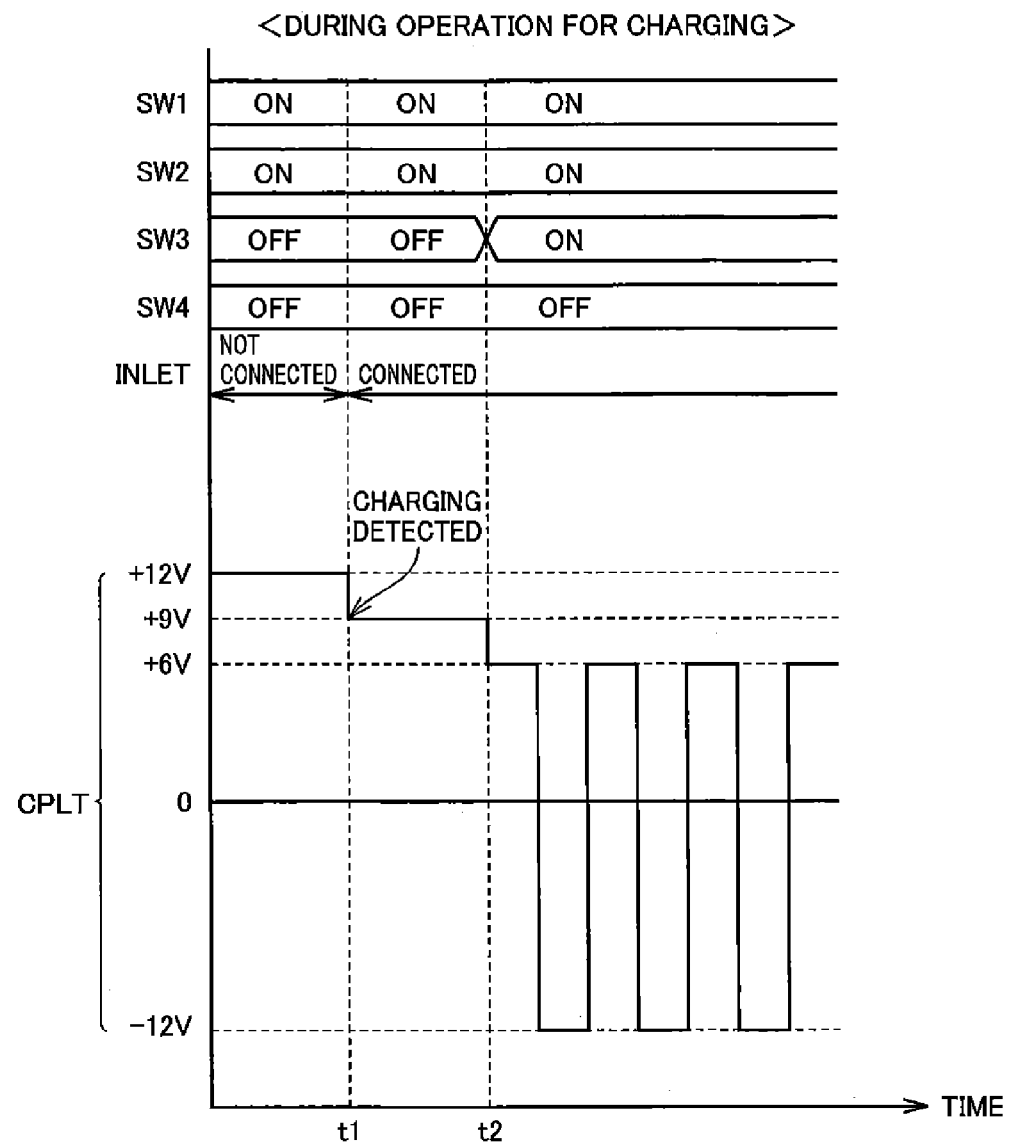
FIG. 8 shows a change in a signal CPLT when performing charging operation.

FIG. 8 shows a change in signal CPLT when performing the charging operation.

Referring to FIG. 7 and FIG. 8, when step S82 and step S53 are performed, switches SW1, SW2 are set to be on and switches SW3, SW4 are set to be off as indicated at times t1-t2 in FIG. 8. When the connector of the cable is connected to the vehicular inlet, signal CPLT is changed from 12 V to 9 V as indicated at time H.

When this change is detected in step S83, the process goes to a step S84 in the vehicle to control switch SW3 to become the on state from the off state. Accordingly, as indicated at time t2 in FIG. 8, the voltage of signal CPLT is changed from 9 V to 6 V.

Referring to FIG. 3 again, by detecting that the potential of pilot signal CPLT is changed from 0 V to a defined potential V1 (for example, 12V), CCID control unit 610 can detect that plug 320 of charging cable 300 has been connected to power receptacle 400. On the other hand, by detecting that the potential of pilot signal CPLT is changed from defined potential V1 (for example, 12 V) to V2 (for example, 9V), CCID control unit 610 can detect that charging connector 310 of charging cable 300 has been connected to vehicular inlet 270 of vehicle 10.

When the potential of pilot signal CPLT is decreased from 9 V, pilot signal CPLT oscillates at a defined cycle T. Here, a pulse width Ton of pilot signal CPLT is set based on the rated current that can be supplied from external power source 402 to vehicle 10 via charging cable 300. Namely, notification of the rated current is provided from control pilot circuit 334 to ECU 170 of vehicle 10 using pilot signal CPLT with a duty indicated by a ratio of pulse width Ton to cycle T.

It should be noted that a rated current is determined for each charging cable. Hence, rated currents differ when types of charging cables are different. Hence, the duty of pilot signal CPLT differs for each charging cable.

ECU 170 of vehicle 10 can detect the rated current that can be supplied from external power source 402 to the vehicle via charging cable 300, based on the duty of pilot signal CPLT received via control pilot signal line L1.

When the potential of pilot signal CPLT is decreased by ECU 170 to around the defined potential (for example, 6 V), in a step S54 of FIG. 7, control pilot circuit 334 detects the decrease of the potential thereof. Then, in a step S55, control pilot circuit 334 supplies a current to electromagnetic coil 606. When electromagnetic coil 606 is supplied with the current from control pilot circuit 334, electromagnetic coil 606 generates electromagnetic power to turn on CCID relay 332. By controlling the potential of pilot signal CPLT using resistance circuit 502, CCID relay 332 can be remotely controlled from ECU 170.

Accordingly, in a step S56 and a step S85, the vehicle starts to be charged from the infrastructure.

It should be noted that the change in the potential of pilot signal CPLT as shown in FIG. 8 is standardized by the SAE Standards. Hence, the change in the potential is controlled to be similar even when charging a vehicle of different manufacturer or a different vehicle. Accordingly, the charging cable can be shared by different vehicles and vehicles of different manufacturers.

Referring to FIG. 7 again, when it is determined in step S52 that the operation mode designated is not the charging mode, the process goes to a step S60 to determine whether or not the operation mode designated is the power generation mode for generating power from the vehicle. When the operation mode designated is not the power generation mode in step S60, the process is terminated in a step S71. When the operation mode designated is the power generation mode in step S60, the process goes to a step S61. In step S61, it is determined whether or not the operation requested is power generation to cope with an emergency such as power failure, i.e., whether or not the operation mode designated is the independent power generation mode.

In step S61, when it is determined that the operation mode is the independent power generation mode, the process goes to a step S62 to control system interconnection relay 22 to become off, thereby isolating the connection target facility from the system power grid. Then, in a step S63, switch SW1 is set to become on and switch SW2 is set to become off.

Figure 9:
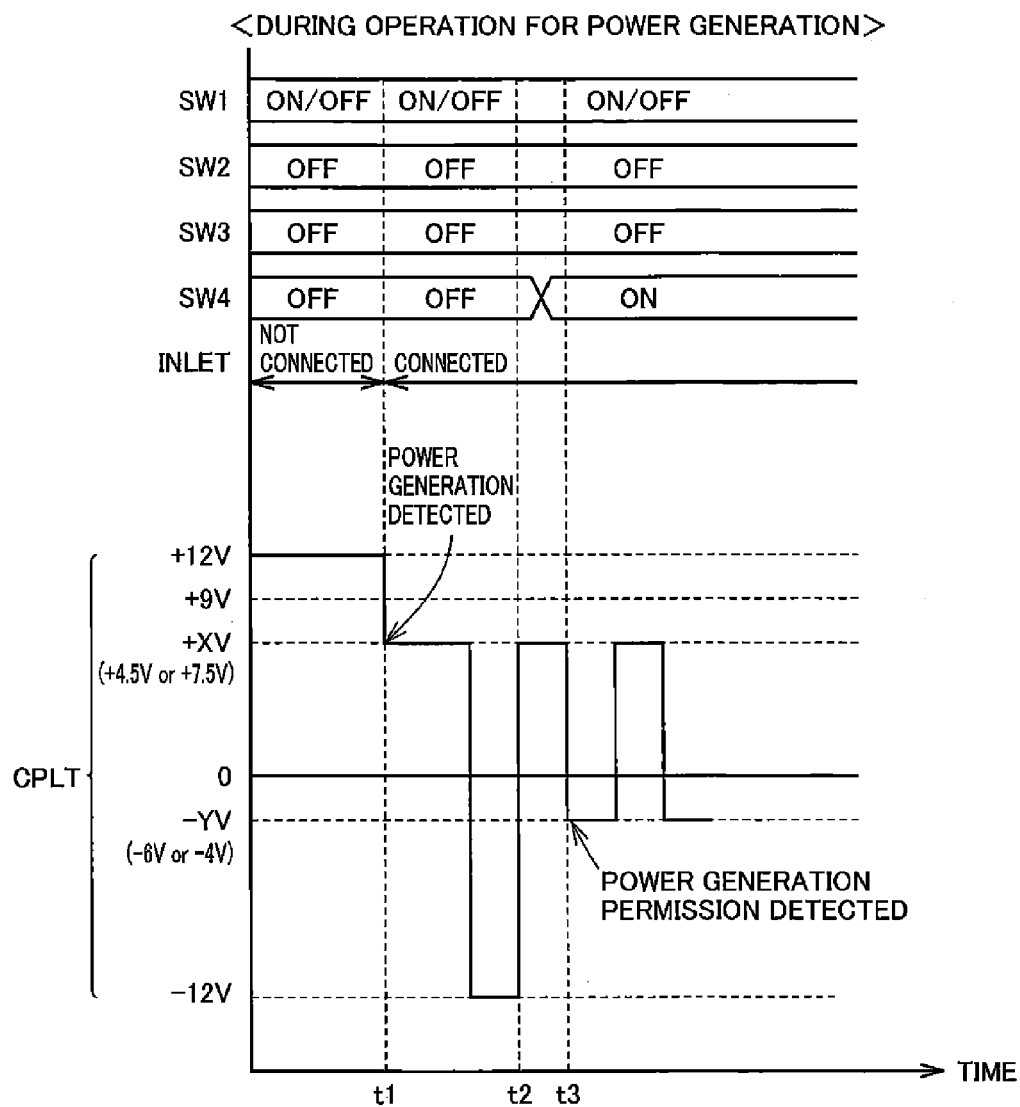
FIG. 9 is a waveform diagram for illustrating change in signal CPLT during power generation operation.

FIG. 9 is a waveform diagram for illustrating change in signal CPLT during the power generation operation.

Referring to FIG. 7 and FIG. 9, when the cable connector is connected to the vehicular inlet at time t1 and the setting for resistance circuit RB of the infrastructure is completed, the voltage of signal CPLT is decreased from +12 V to +XV. Here, XV=7.5V in the independent power generation mode, and XV=4.5 V in the system interconnection power generation mode.

In the setting in step S63, the voltage of signal CPLT is changed to 7.5 V at time t1. This change in voltage is detected in a step S86, and the process in the vehicle goes to a step S87. In step S87, it is determined whether or not the vehicle can generate power (or can discharge from the power storage device). For example, in the case where the vehicle is a hybrid vehicle or a fuel cell vehicle and its remaining fuel is smaller than a required amount, it is determined that power generation cannot be performed. On the other hand, in the case where the vehicle is an electric vehicle and the State Of Charge in the power storage device is smaller than a required value, it is determined that discharging cannot be performed. Apart from these, it is also determined that power generation cannot be performed, in the case where the vehicle has a schedule management function and it is known that the vehicle will soon depart for traveling or in the case where supply of power from the vehicle to the connection target facility is inappropriate. Accordingly, the process is terminated in a step S94.

In step S87, when supply of power from the vehicle to the connection target facility is appropriate, the process goes to a step S88. In step S88, switch SW4 is set to be switched from the off state to the on state for the purpose of notification that the vehicle has completed the preparation for power generation.

This allows a current to flow through resistor R6 and diode D2 while oscillating circuit 602 outputs a negative voltage, whereby the potential of signal CPLT is divided by resistance circuit RA and resistance circuit RB. Accordingly, as indicated at a time t3 or later in FIG. 9, the negative voltage of signal CPLT can be divided at a voltage division ratio different from that for the positive voltage thereof.

In the infrastructure, in a step S64, it is determined using voltage sensor 604 of FIG. 5 whether or not the negative voltage of signal CPLT has reached −6 V. If the voltage of −6 V is not detected in step S64, detection is performed again after standby for a while. When the detection of −6 V is detected in step S64, the infrastructure has detected that the vehicle is ready for the power generation. Accordingly, in step S65, independent power reception is started therein. On the other hand, in the vehicle, independent power generation is started in a step S89.

In step S61, in the case where the operation mode requested from the infrastructure to the vehicle is not the independent power generation mode, the process goes to a step S66. In step S66, it is determined whether to perform the system interconnection power generation, i.e., whether or not the operation mode requested from the infrastructure to the vehicle is the system interconnection power generation mode. When the operation mode is not the system interconnection power generation mode in step S66, the process is terminated in step S71.

When it is determined in step S66 that the operation mode is the system interconnection power generation mode, the process goes to a step S67. In step S67, system interconnection relay 22 is controlled to become on, thereby connecting the system power grid and the connection target facility to each other. Although not in the figure, in order to perform the system interconnection power generation, the vehicle is provided with a device having a function such as the function of the power conditioner shown in FIG. 1.

Further, in step S68, switches SW1, SW2 are set to become off. In the setting in step S68, the voltage of signal CPLT is changed to 4.5 V at time t1. Accordingly, in the vehicle, the process goes from step S86 to a step S90. When this change in voltage is detected in step S90, the process in the vehicle goes to a step S91. In step S91, it is determined whether or not the vehicle can generate power (or can discharge from the power storage device). For example, in the case where the vehicle is a hybrid vehicle or a fuel cell vehicle and its remaining fuel is smaller than a required amount, it is determined that power generation cannot be performed. On the other hand, in the case where the vehicle is an electric vehicle and the State Of Charge in the power storage device is smaller than a required value, it is determined that discharging cannot be performed. Apart from these, it is also determined that power generation cannot be performed, in the case where the vehicle has a schedule management function and it is known that the vehicle will soon depart for traveling or in the case where supply of power from the vehicle to the connection target facility is inappropriate. When CPLT=4.5V is not detected in step S90 or when it is determined in step S91 that the power generation cannot be performed, the process is terminated in a step S94.

In step S91, when supply of power from the vehicle to the connection target facility is appropriate, the process goes to a step S92. In step S92, switch SW4 is set to be switched from the off state to the on state for the purpose of notification that the vehicle has completed the preparation for the power generation.

This allows a current to flow through resistor R6 and diode D2 while oscillating circuit 602 outputs a negative voltage, whereby the potential of signal CPLT is divided by resistance circuit RA and resistance circuit RB. Accordingly, as indicated at a time t3 or later in FIG. 9, the negative voltage of signal CPLT can be divided at a voltage division ratio different from that for the positive voltage thereof.

In the infrastructure, in a step S69, it is determined using voltage sensor 604 of FIG. 5 whether or not the negative voltage of signal CPLT has reached −4 V. If the voltage of −4 V is not detected in step S64, detection is performed again after a certain time interval. When the detection of −4 V is detected in step S69, the infrastructure has detected that the vehicle is ready for the power generation. Accordingly, in step S70, system interconnection power reception is started therein. On the other hand, in the vehicle, system interconnection power generation is started in a step S93.

As described above, the present embodiment provides the communication device, the communication system, and the vehicle, each of which can implement communication for vehicular power generation while complying with the conventional communication standards concerned with charging.

Finally, referring to FIG. 2 and FIG. 3 again, the present embodiment is summarized. The communication system described in the present embodiment includes vehicle 10, and the communication device (connection target facility 20) communicating with the vehicle. The communication device (connection target facility 20) includes: the signal generating unit (oscillating circuit 602) for generating a signal having a signal potential that is based on a reference potential; and first terminal TS1 for communicating with the vehicle; and first resistance circuit RB connected between the output of the signal generating unit (oscillating circuit 602) and first terminal TS1 and having a resistance value corresponding to a requested operation mode requested to the vehicle. Vehicle 10 includes: second terminal TS2 connected to first terminal TS1; second resistance circuit RA connected between ground node 512 fed with the reference potential and second terminal TS2; and the vehicle control unit (CPU 508) for determining the operation mode of the vehicle. As shown in steps S83, S86, S90 in FIG. 7, the vehicle control unit (CPU 508) detects the signal potential of signal CPLT via first signal extraction node N1 provided on the path connecting second terminal TS2 and second resistance circuit RA to each other, so as to set the operation mode of vehicle 10 at the requested operation mode corresponding to the resistance value of first resistance circuit RB.

Preferably, as shown in FIG. 5, second resistance circuit RA is configured to have a resistance value variable according to control signal SA provided from the vehicle control unit (CPU 508). As shown in steps S84, S88, S92 in FIG. 7, after completing setting the operation mode of vehicle 10 at the requested operation mode, the vehicle control unit (CPU 508) changes the resistance value of second resistance circuit RA from a first value to a second value different from the first value.

Preferably, vehicle 10 has the "charging mode" and the "power generation mode" as the operation mode. The charging mode is a power receiving mode for receiving power from outside. The power generation mode is a power supply mode for supplying power to outside.

More preferably, second resistance circuit RA is configured to have a resistance value variable according to the control signal supplied from the vehicle control unit (CPU 508). After completing setting the operation mode of the vehicle at one of the "charging mode" and "power generation mode", the vehicle control unit (CPU 508) changes the resistance value of second resistance circuit RA from the first value to the second value different from the first value.

More preferably, the positive amplitude and the negative amplitude of the signal output by the signal generating unit (oscillating circuit 602) are divided by first resistance circuit RB and second resistance circuit RA. After designating one of the "charging mode" and the "power generation mode" with a voltage division value for the positive amplitude, the vehicle control unit (CPU 508) performs the control regarding the "charging mode" with the positive amplitude as shown in FIG. 8, or performs control regarding the "power generation mode" with the negative amplitude as shown in FIG. 9.

More preferably, the vehicle further includes rectifier circuit D for differentiating the divided potential value of the positive amplitude and the divided potential value of the negative amplitude from each other by changing the resistance value of first resistance circuit RB for the positive side and the negative side relative to the reference potential. Various modifications of rectifying circuit D can be employed as long as the divided potential can be changed for the positive side and the negative side, as shown in FIG. 5. For example, a resistor and a diode connected in series may be provided in parallel with resistors R4, R5.

More preferably, the communication device is included in connection target facility 20 including system interconnection relay 22 allowing for connection and disconnection to and from the commercial power grid (external power source 402). As the power supply mode, vehicle 10 has the "system interconnection power generation mode" for generating power with interconnection with the commercial power grid, and has the "independent power generation mode" for generating power with the facility being disconnected from the commercial power grid.

Further preferably, the communication device further includes CCID control unit 610 for switching the resistance value of first resistance circuit RB to a value corresponding to the operation mode, depending on whether the operation mode requested to the vehicle is the "charging mode", the "system interconnection power generation mode", or the "independent power generation mode".

The communication device according to another aspect of the present embodiment is a communication device for communicating with the vehicle. The communication device includes signal generating unit (oscillating circuit 602) for generating the signal including the signal potential that is based on the reference potential; first terminal TS1 for communicating with vehicle 10; first resistance circuit RB connected between the output of signal generating unit 602 and first terminal TS1 and having the resistance value varying according to first input signal SB; and CCID control unit 610 for providing first input signal SB to first resistance circuit RB. Vehicle 10 includes: second terminal TS2 connected to first terminal TS1; second resistance circuit RA connected between ground node 512 fed with the reference potential and second terminal TS2; and the vehicle control unit (CPU 508) for setting the operation mode of vehicle 10. The vehicle control unit (CPU 508) detects the signal potential of signal CPLT via first signal extraction node N1 provided on the path connecting second terminal TS2 and second resistance circuit RA to each other, so as to set the operation mode of vehicle 10 at the requested operation mode corresponding to the resistance value of first resistance circuit RB, and then changes the resistance value of second resistance circuit RA. CCID control unit 610 detects that the resistance value of second resistance circuit RA has been changed, and then starts an operation corresponding to the operation mode requested.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

Description of the Reference Signs

10: vehicle; 20: connection target facility; 22: system interconnection relay; 24: solar cell; 26: power conditioner; 28: household electrical load; 30: household controller; 130: wheel; 150: power storage device; 160: power converter; 170: control device; 180: vehicular electrical load; 182, 504, 504C, 504G, 504C, 504G, 604, 650: voltage sensor; 190, 332: relay; 270: vehicular inlet; 300: charging cable; 310: charging connector; 312: limit switch; 320: plug; 334: control pilot circuit; 340, 340a, 340b: electric wire portion; 400: power receptacle; 402: external power source; 502: resistance circuit; 506: input buffer; 512: ground node; 602: oscillating circuit; 606: electromagnetic coil; 608: electrical leakage detector; 610: CCID control unit; 660: current sensor; ACL1, ACL2, ACL1: power line; D: rectifying circuit; D1, D2: diode; DA: selecting circuit; L1: control pilot signal line; L2: ground line; L3: signal line; N1B, N1A: node; N1: node; N2: node; R1, R2, R3, R2, R3, R4, R5, R6: resistor; RA, RB: resistance circuit; SW1, SW1, SW2, SW2, SW3, SW3, SW4, SW4: switch; TC2, TG2, TP1, TPG1, TS1, TG1, TC1, TP2, TPG2, TS2, TG2, TC2, TP2: terminal; TR1, TR2: transistor.

The invention claimed is:

1. A vehicle communicating with a communication device, the communication device including:
    a signal generating unit for generating a signal including a signal potential that is based on a reference potential;
    a first terminal for communicating with the vehicle; and
    a first resistance circuit connected between an output of said signal generating unit and said first terminal and having a resistance value corresponding to a requested operation mode requested to the vehicle,
    the vehicle comprising:
    a second terminal connected to said first terminal;
    a second resistance circuit connected between a node fed with said reference potential and said second terminal; and
    a vehicle control unit for setting an operation mode of the vehicle,
    said vehicle control unit detecting the signal potential of said signal via a first signal extraction node provided on a path connecting said second terminal and said second resistance circuit to each other, so as to set the operation mode of the vehicle at said requested operation mode corresponding to the resistance value of said first resistance circuit.

2. The vehicle according to claim 1, wherein:
    said second resistance circuit is configured to have a resistance value variable according to a control signal provided from said vehicle control unit, and
    after completing setting the operation mode of the vehicle at said requested operation mode, said vehicle control unit changes the resistance value of said second resistance circuit from a first value to a second value different from said first value.

3. The vehicle according to claim 1, wherein as said operation mode, the vehicle has a first mode for receiving power from outside, and a second mode for supplying power to outside.

4. The vehicle according to claim 3, wherein:
    said second resistance circuit is configured to have a resistance value variable according to a control signal provided from said vehicle control unit, and
    after completing setting the operation mode of the vehicle at one of said first and second modes, said vehicle control unit changes the resistance value of said second resistance circuit from a first value to a second value different from said first value.

5. The vehicle according to claim 3, wherein:
    positive amplitude and negative amplitude of the signal output by said signal generating unit are divided by said first resistance circuit and said second resistance circuit, and
    after designating one of said first and second modes with a voltage division value for said positive amplitude, said vehicle control unit performs control regarding said first mode with said positive amplitude or performs control regarding said second mode with said negative amplitude.

6. The vehicle according to claim 5, further comprising a rectifying circuit for differentiating the voltage division value for said positive amplitude and the voltage division value for said negative amplitude from each other by changing the resistance value of said first resistance circuit for the positive side and the negative side relative to said reference potential.

7. The vehicle according to claim 3, wherein:
    the communication device is included in a facility including a system interconnection relay allowing for connection and disconnection to and from a commercial power grid, and
    as said second mode, the vehicle has a system interconnection power generation mode for generating power with interconnection with said commercial power grid, and an independent power generation mode for generating power with the facility being disconnected from said commercial power grid.

8. A communication system comprising:
    a vehicle; and
    a communication device communicating with the vehicle, the communication device including:
        a signal generating unit for generating a signal including a signal potential that is based on a reference potential;
        a first terminal for communicating with the vehicle; and
        a first resistance circuit connected between an output of said signal generating unit and said first terminal and having a resistance value corresponding to a requested operation mode requested to the vehicle,
    the vehicle including:
        a second terminal connected to said first terminal;
        a second resistance circuit connected between a node fed with said reference potential and said second terminal; and
        a vehicle control unit for setting an operation mode of the vehicle,
    said vehicle control unit detecting the signal potential of said signal via a first signal extraction node provided on a path connecting said second terminal and said second resistance circuit to each other, so as to set the operation mode of the vehicle at said requested operation mode corresponding to the resistance value of said first resistance circuit.

9. The communication system according to claim 8, wherein:
    said second resistance circuit is configured to have a resistance value variable according to a control signal provided from said vehicle control unit, and
    after completing setting the operation mode of the vehicle at said requested operation mode, said vehicle control unit changes the resistance value of said second resistance circuit from a first value to a second value different from said first value.

10. The communication system according to claim 8, wherein as said operation mode, the vehicle has a power receiving mode for receiving power from outside, and a power supply mode for supplying power to outside.

11. The communication system according to claim 10, wherein:
said second resistance circuit is configured to have a resistance value variable according to a control signal provided from said vehicle control unit, and
after completing setting the operation mode of the vehicle at one of said power receiving mode and said power supply mode, said vehicle control unit changes the resistance value of said second resistance circuit from a first value to a second value different from said first value.

12. The communication system according to claim 10, wherein:
positive amplitude and negative amplitude of the signal output by said signal generating unit are divided by said first resistance circuit and said second resistance circuit, and
after designating one of said power receiving mode and said power supply mode with a voltage division value for said positive amplitude, said vehicle control unit performs control regarding said power receiving mode with said positive amplitude or performs control regarding said power supply mode with said negative amplitude.

13. The communication system according to claim 10, wherein:
the communication device is included in a facility including a system interconnection relay allowing for connection and disconnection to and from a commercial power grid, and
as said power supply mode, the vehicle has a system interconnection power generation mode for generating power with interconnection with said commercial power grid, and an independent power generation mode for generating power with the facility being disconnected from said commercial power grid.

14. The communication system according to claim 13, wherein the communication device further includes a control unit for switching the resistance value of said first resistance circuit to a value corresponding to said operation mode requested to the vehicle, depending on whether said operation mode requested to the vehicle is said power receiving mode, said system interconnection power generation mode, or said independent power generation mode.

15. A communication device communicating with a vehicle, comprising:
a signal generating unit for generating a signal including a signal potential that is based on a reference potential;
a first terminal for communicating with the vehicle;
a first resistance circuit connected between an output of said signal generating unit and said first terminal and having a resistance value varying according to a first input signal corresponding to an operation mode requested to the vehicle; and
a control unit for providing said first input signal to said first resistance circuit,
the vehicle including:
a second terminal connected to said first terminal;
a second resistance circuit connected between a node fed with said reference potential and said second terminal; and
a vehicle control unit for setting an operation mode of the vehicle,
said vehicle control unit detecting the signal potential of said signal via a first signal extraction node provided on a path connecting said second terminal and said second resistance circuit to each other so as to set the operation mode of the vehicle at the operation mode corresponding to the resistance value of said first resistance circuit, and then changing the resistance value of said second resistance circuit,
said control unit detecting that the resistance value of said second resistance circuit has been changed and starting an operation corresponding to the operation mode requested.

* * * * *